Figure 1:
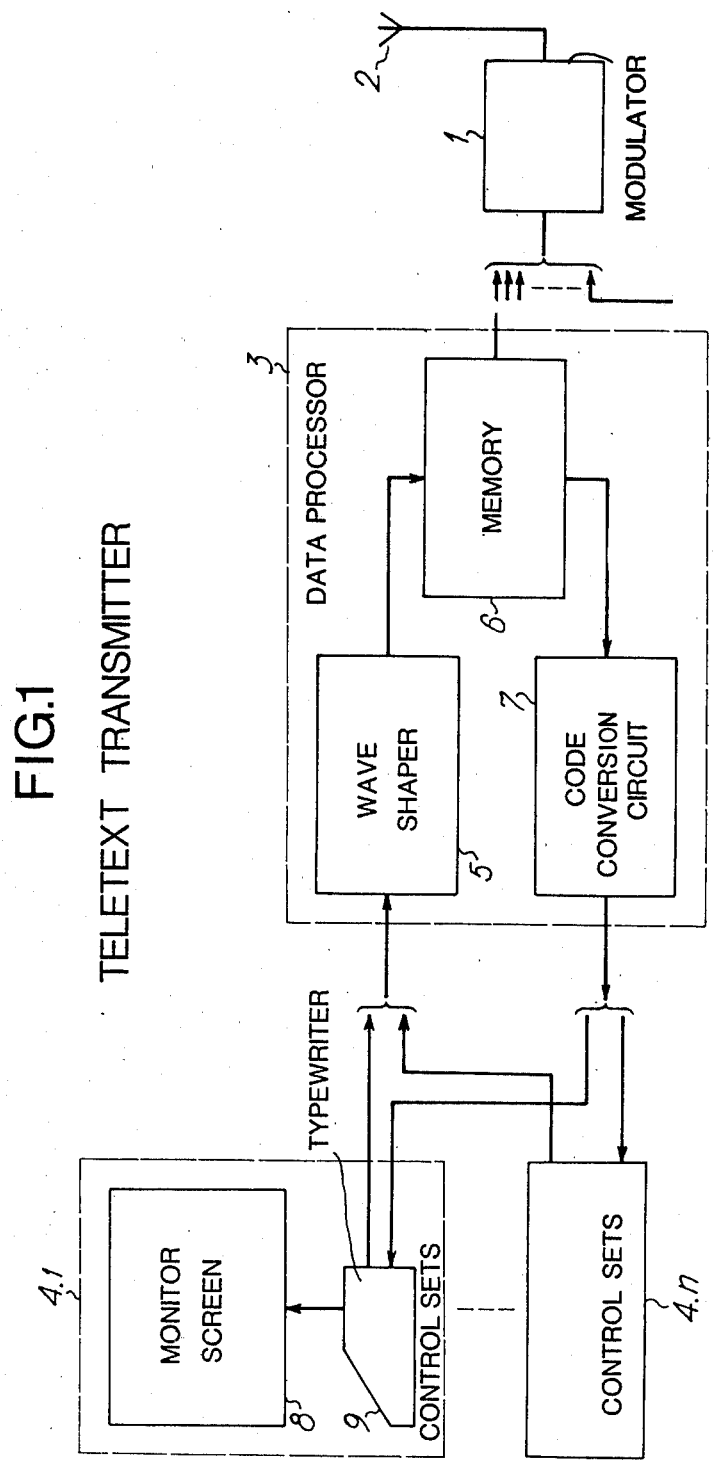

United States Patent [19]

Poignet et al.

[11] 4,361,848

[45] Nov. 30, 1982

[54] SYSTEM FOR DIGITALLY TRANSMITTING AND DISPLAYING DATA ON TELEVISION RECEIVER SCREEN

[75] Inventors: Alain Poignet; Claude Fournier; Martine Le Marouille, all of Rennes, France

[73] Assignee: L'Etat Francais, Montrouge, France

[21] Appl. No.: 39,837

[22] Filed: May 17, 1979

Related U.S. Application Data

[63] Continuation of Ser. No. 830,165, Sep. 2, 1977, abandoned.

[30] Foreign Application Priority Data

Sep. 6, 1976 [FR] France .................................. 76 27212

[51] Int. Cl.³ ........................... H04N 1/32; G06F 3/14
[52] U.S. Cl. ....................................... 358/1; 358/146; 358/258; 358/280; 340/711
[58] Field of Search ................... 358/1, 75, 78, 81, 82, 358/141, 142, 146, 256, 257, 258, 280; 340/154, 711, 706

[56] References Cited

U.S. PATENT DOCUMENTS

| | | | |
|---|---|---|---|
| 3,524,182 | 8/1970 | Criscimagna et al. | 340/154 X |
| 3,559,207 | 1/1971 | Atkinson | 340/154 X |
| 3,771,155 | 11/1973 | Hayashi et al. | 340/324 AD |
| 3,911,418 | 10/1975 | Takeda | 340/324 AD |
| 4,042,958 | 8/1977 | Saylor et al. | 358/141 |
| 4,054,911 | 10/1977 | Fletcher et al. | 358/146 X |
| 4,058,830 | 11/1977 | Guinet et al. | 340/149 A X |

FOREIGN PATENT DOCUMENTS

1467240  3/1977  United Kingdom ................ 358/256

OTHER PUBLICATIONS

GEC Journal of Science & Technology, vol. 41, No. 4, 1974-Bigg & Barnaby.
Specification of Standards for Information Transmission by Digitaly coded signals in the field-blankking interval of 625 line television systems, Oct. 1974, BBC publication.
Scientific American, Jul. 1979, p. 86.
Oracle-An information Broadcasting Service Using Data Transmission in the Verticle Interval-McKenzie--Jan. 1974, Journal of the SMPTE, vol. 83 pp. 6-10.
Oracle-Broadcasting the Written Word-Jul. 1973, Wireless World, James, pp. 314-316.
Oracle-Broadcasting the Written Word-Sep. 1973, British Kinematography Sound and Television, James, pp. 290-291 & 312.
CEEFAX: A Proposed New Broadcasting Service-Edwardson & Gee, Jan. 74, Journal of the SMPTE, vol. 83 pp. 14-19.

*Primary Examiner*—Stuart N. Hecker
*Attorney, Agent, or Firm*—Laff, Whitesel, Conte & Saret

[57] ABSTRACT

A teletext system for broadcast of pages of magazines to be displayed on television receiver screen. A subscriber entitled to receive a magazine can select a desired page thereof by actuating a keyboard to transmit 8-bit words belonging to two groups: first properly said character words and second function words. Among the function words, there are page flag words which indicate that a page number word follows it and make the selection possible. A row flag word is followed by a row number word to indicate the vertical address of a sequence of characters in a page. Adaptation means are provided for adapting the voltage/light characteristics, as in a current gamma correction, which permits correctly displayed logic signals.

3 Claims, 4 Drawing Figures

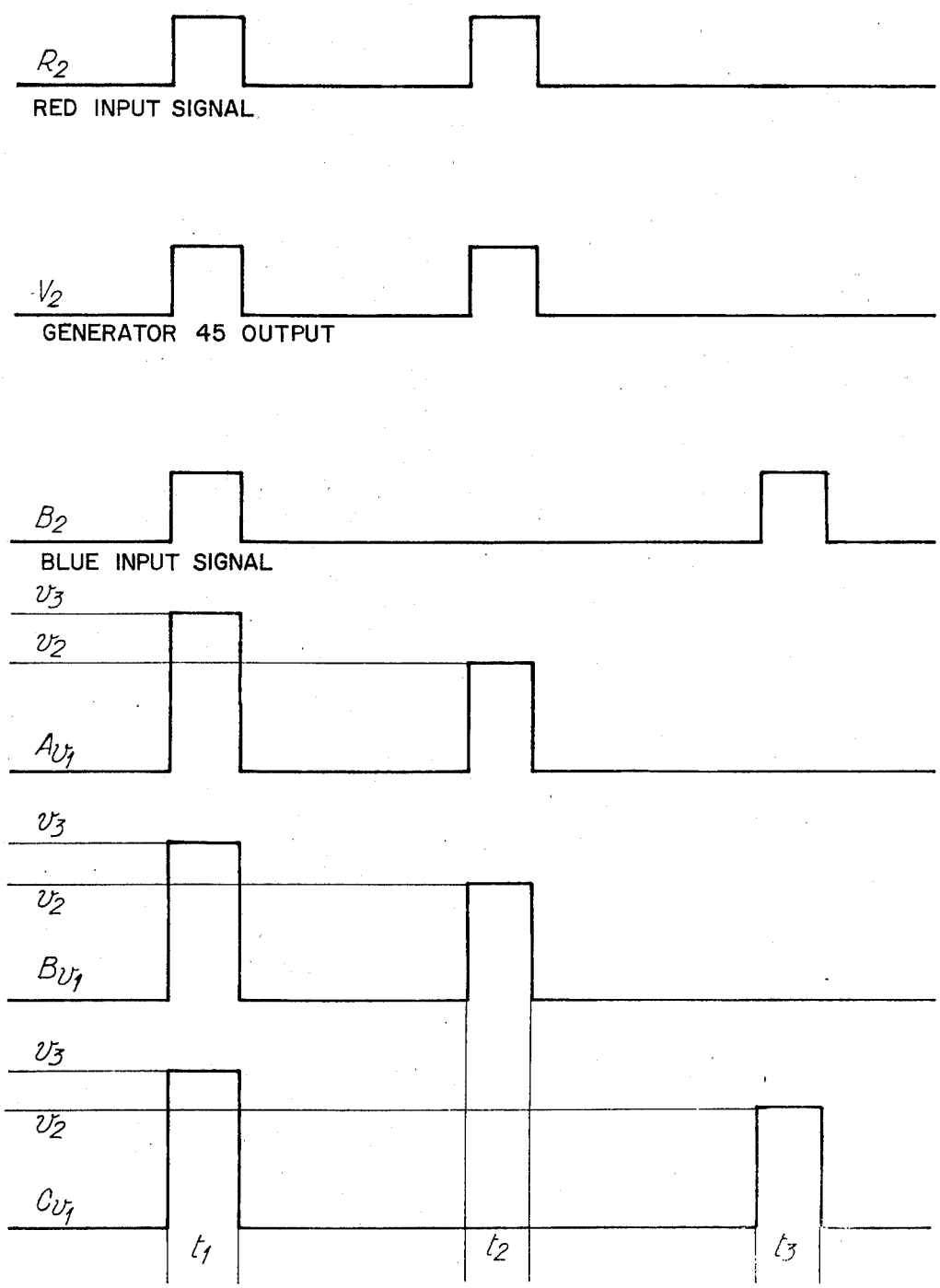

SYSTEM FOR DIGITALLY TRANSMITTING AND DISPLAYING DATA ON TELEVISION RECEIVER SCREEN

This is a continuation of application Ser. No. 830,165 filed Sept. 2, 1977, now abandoned.

The present invention relates to a system for digitally transmitting and displaying selected items of data on a television receiver screen. In short, such a system will be called a "teletext" system in the following specification. More particularly, the invention relates to a teletext system receiver.

The growing importance of information communication has resulted in the building of data banks in such a manner that the data banks are usable in developing information processing technics and audiovisual means. Updating files wherein data are stored makes those systems efficient, but the cost of the information supports presently limits the field of the utilization thereof. A teletext system makes it possible to broadcast those data from central processing stations wherein data issue is also made. Such a centralized station is similar to that of newspaper structures and radio broadcasting is close to newspaper and periodical distribution.

In fact a teletext system involves several aspects, its main goal being to achieve the widest possible broadcasting of stored data through RF channels. At the reception end, the major data display means is the television receiver display screen. It displays pages of a text or graphics which are transmitted in an encoded form as, for example, described in the U.S. Patent Application Ser. No. 689,493 filed on June 3, 1976, now U.S. Pat. No. 4,058,830.

A teletext service may also be transmitted through the public or a private telephone network through which a teletext subscriber calls a data bank having a memory serving as a file for information arranged in pages. By means of a key board used by the subscriber to select a page, the subscriber can answer questions directed to him from the file processing unit and the pages he desires are sent to him.

In television broadcasting, the waiting time for a desired page depends on the transmission capacity which the teletext system has as well as the number of pages in the file or magazine. The transmission capacity may considerably vary according as a full television channel is alloted to the teletext system or only some blank lines. By way of an example, with a magazine containing about fifty pages and a transmission capacity of one line per frame, the mean waiting time is of about fifteen seconds.

In the case of a transmission through a telephone network, the central unit answers very rapidly, but the data transmission is performed at a low rate due to the narrow frequency band width available and mean waiting time may have a duration of several tens of seconds.

Whatever is the utilized transmission medium, a teletext system first requires the selection of a page of information from among a plurality of available pages, the transmission of the selected page or pages, and, finally, the display of the selected page on a television screen. On that screen, the pictures constituted by the written page or the graphics have no half-tints. The utilization of a television receiver that can, in addition, receive standardized television programs imposes certain constraints resulting from the television tube resolution, i.e. about 25 rows of 40 characters each. Such a tube makes it possible to use a set of 8 colors, for instance, to obtain a very clear page setting. The used alphabets depend on how characters are written in the country wherein the teletext system is utilized. In France, a proposed system comprises a Latin alphabet of 126 signs which extends the system to most of the languages utilizing a Latin alphabet.

By way of example of a teletext system, reference may be made to the technical article entitled "Broadcast data in television" by A. J. Biggs and B. S. Barnaby published in the English technical review "GEC Journal of Science and Technology", vol. 41, No. 4, p. 117-124, 1974, and to the British Pat. No. 1 467 240. Reference may also be made to the technical article entitled "ANTIOPE, service de télétexte" by B. Marti and M. Mauduit, published in the French technical review "radiodiffusion télévision", 9th year, No. 40, November-December 1975, 5/5, p. 18-23. In the last mentioned article, the features of the previously described system are indicated. Furthermore in the described service, pages are assembled in various magazines, each magazine being cyclically broadcasted in full. Each page is identified by its page number. Some of those pages contain summaries and appear to help the selection of the desired page by means of a keyboard. Among the special functions that a teletext system may fulfill, one would cite the insertion of a text in a television picture under the form of a caption in a language selected by the television subscriber. Such captions may either be rigidly associated with the picture or relate to short news regarding a predetermined subject matter; they may be written in a rectangular box cut in a current picture or disappear at the subscriber's will. Features of that type obviously also concern educational programs.

According to a feature of this invention, there is provided a system for digitally transmitting and displaying texts on a television screen, wherein the transmitter station broadcasts, particularly in the form of data packs, data from several channels. The data packs from different channels may possibly be time multiplexed. Each pack comprises a prefix signal allowing a receiver to accept the data packs of a channel and to reject other data packs. The set of the data packs of a channel constitute a magazine made of several pages, wherein the data packs belonging to a page are transmitted not multiplexed with data packs of another page of the same magazine. Data belonging to a page begin with a page flag followed by data indicating the page number, and end with the next page flag. The system receiver comprises a keyboard making it possible to dial the number of the desired page. A circuit for recognizing the page flags energizes a comparator circuit for comparing the data that immediately follow any page flag with the number dialled on the keyboard. The data is, when the comparison is positive, sent to a memory that stores the character data. A character generator is capable of displaying on the screen of a television receiver tube the characters from data read out from the memory.

According to another feature of this invention, there is provided a teletext system wherein the data belonging to each page are grouped in rows (or page lines). The data belonging to each row is preceded by a row flag followed by a row number, and ending with the next row flag. The row number detected after each row flag determines the address at which the row data must be stored in the memory.

According to another feature, from the character data the character generator delivers to a matching circuit the character luminance signals. In addition logic pulses concern the presence or the absence of a basic color R (red), V (green) or B (blue). The matching circuit transfers the luminance signal to conventional circuits of the television receiver. The matching circuit comprises associated with each basic color, a logic input a first diode whose anode is connected to the input of an analog amplifier whose output is connected to the corresponding chrominance television tube input. The anode of the first diode is in addition connected to the anodes of a second and a third diodes. The first diode cathode is connected from the associated color input and the output of a first voltage generator delivering a voltage v2. The second diode cathode is connected from the output of a second voltage generator delivering a voltage v1. The third diode cathode is connected from the output of a third voltage generator delivering a voltage v3. The third generator output is in addition connected to the output of a gate whose output is not grounded when the three color inputs together receive logic pulses and grounded in any other case, with $v3 > v2 > v1$, the values of v1, v2 and v3 being selected appropriately.

Figure 2:
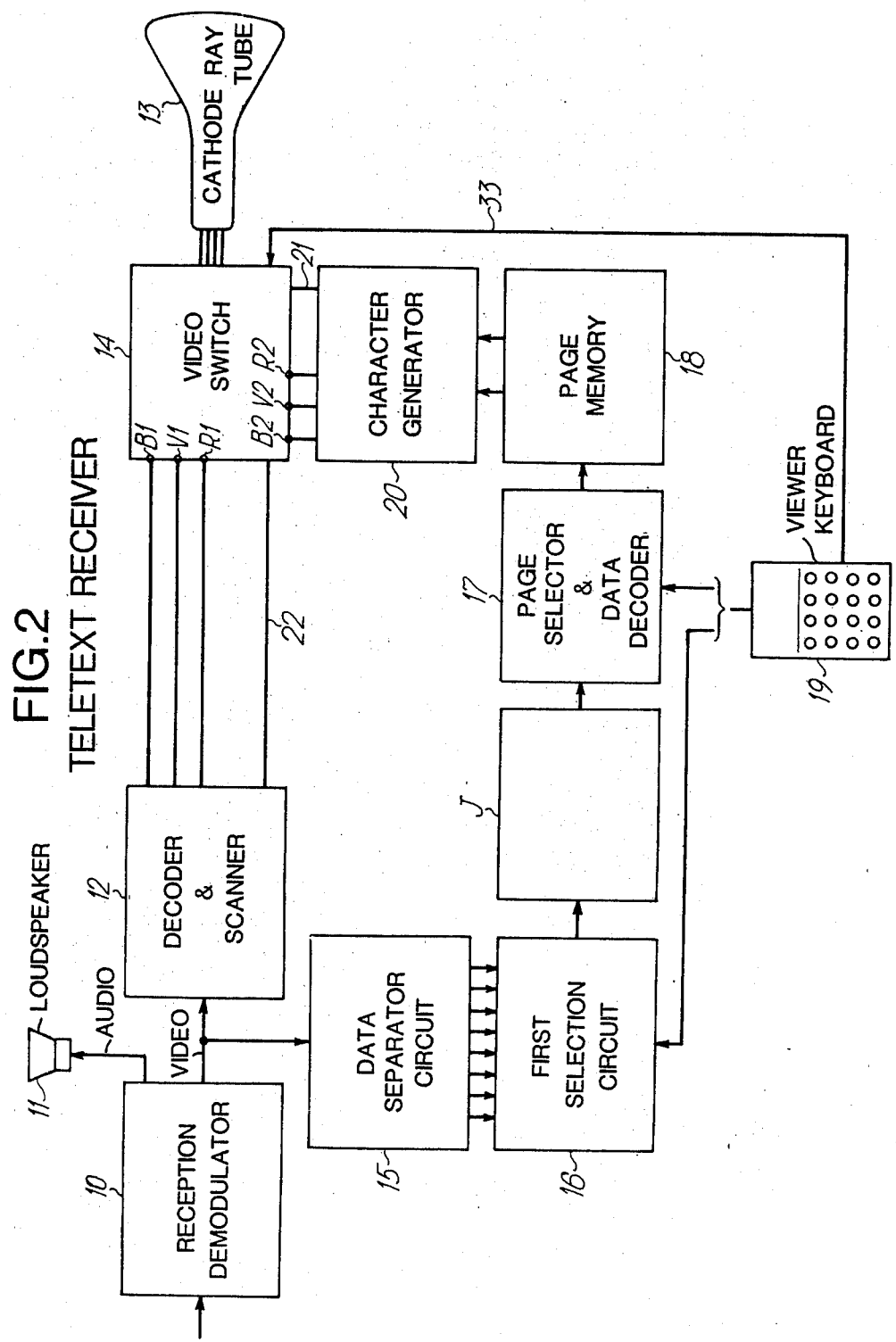
Figure 3:
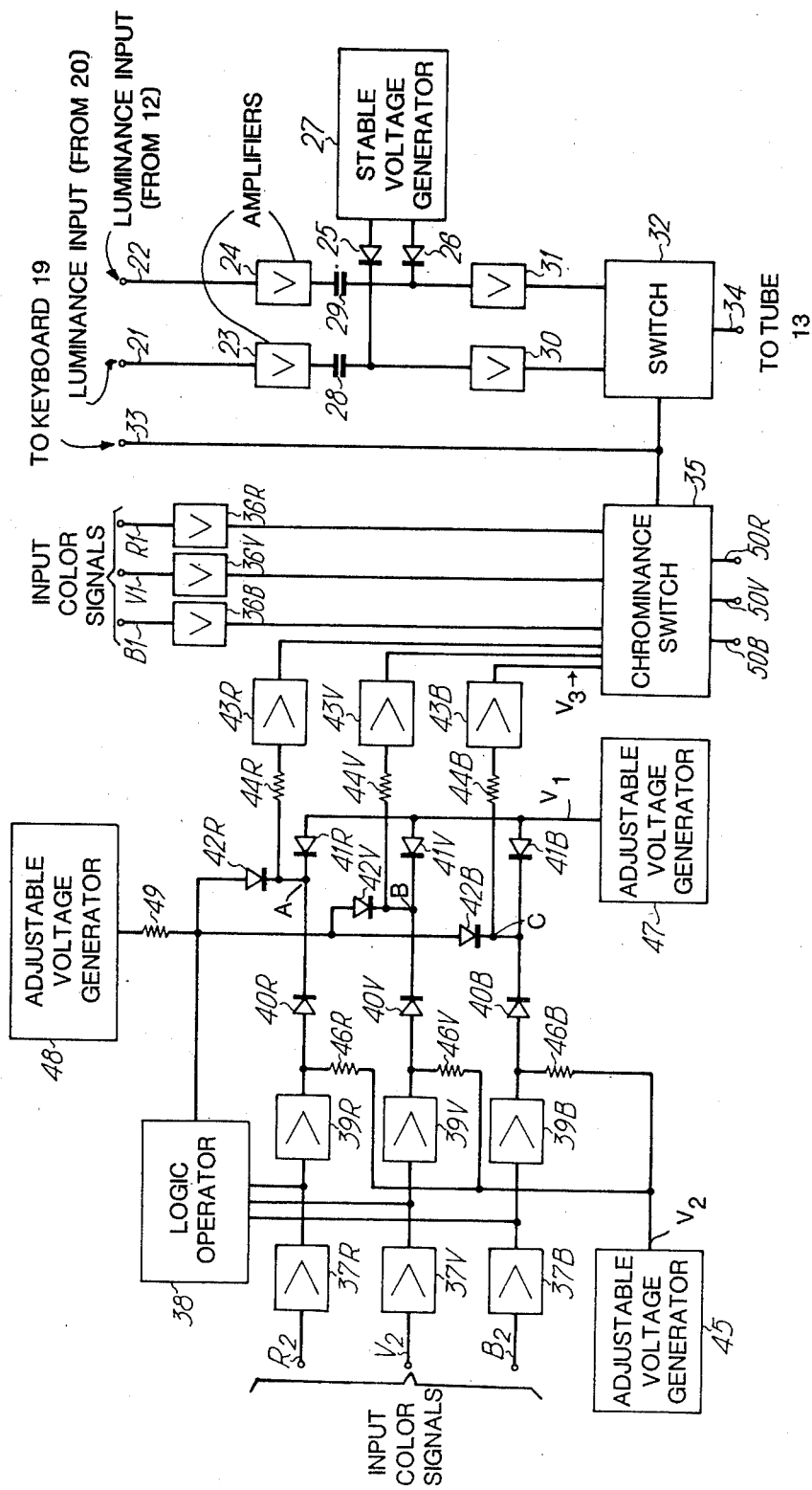

The above mentioned features of the present invention, as well as other features thereof will appear more clearly in the following description of an embodiment, the said description being made in conjunction with the accompanying drawings, wherein:

FIG. 1 is a block diagram of a teletext transmitter according to this invention, FIG. 2 is a block diagram of a teletext receiver according to this invention, FIG. 3 is a schematic diagram of an adaptation circuit for matching the the voltage/light characteristics utilized in the teletext receiver shown in FIG. 2, and FIG. 4 illustrates waveforms of signals used in the adaptation circuit shown in FIG. 3.

The assembly shown in FIG. 1 is similar to that shown in FIG. 1 of the description of the already mentioned U.S. Patent Application Ser. No. 689,493. To a modulator circuitry 1 and transmission antenna 2, switchable are a number of data sources as the data source shown which comprises a data processing circuit 3 connected from a number of control sets 4.1–4.n. Data processing circuit 3 includes a shaping circuit 5, a memory 6 whose input is connected from output of 5 and broadcast output may selectively be connected to modulator circuitry 1 while control output is connected to the input of a conversion circuit 7. Each control set 4.1–4.n includes, as 4.1, a monitor screen 8 and a composing typewritter 9. Each typewriter 9 has a data output connected to the input of circuit 5 and a data input connected from the output of circuit 7.

Each control set 4.1–4.n allows a journalist or an operator to compose pages by means of a typewriter 9 while checking, on the monitor screen 8, every characteristics of the final color picture, i.e. the character size, flashings on and off and graphic particularities. Each typewritter 9 is similar to a typing machine and includes the logic circuitry for composing and updating the documents. Output data from sets 4.1–4.n are put in accordance with standards in circuit 5, then stored in memory 6. Memory 6 may be a disk memory on which is stored the sequences of codes to be transmitted corresponding to the language determined in the above mentioned French technical article. Thus memory 6 constitutes a file of pages that are periodically read out and transmitted to the modulator circuitry 1 to be broadcast. An operator controlling a set 4.1–4.n can also have displayed on his control screen 8 a selected page which is read out from memory 6 through circuit 7.

Embodiments of the equipment shown in FIG. 1 are known. They can either be embodied in a wired logic form or in a programmed form controlled from a computer.

Assumption may be made that, as in the already mentioned U.S. Patent Application Ser. No. 689,493, data broadcast is made on a television channel during the idle lines of the television picture. Those data are assembled in data packs including up to 32 eight-bit words or octets. To each data pack, a prefix is assigned indicate the data source address and the number of words contained in the concerned data pack. When the length of data to be transmitted comprises more than 32 eight-bit words, it is divided into several data packs and each pack containing the prefix pack number in addition to other information. Within the prefix also included are 2 eight-bit words for synchronizing the receiver terminal local oscillator and another eight-bit word for synchronizing the eight-bit words in each data pack. Thus a full transmitted data pack includes 40 8-bit words wherein each of the 320 bits represents black when the bit value is 0 and white when it is 1. Possible interferences are avoided between those digital signals and the proper video signal by selecting a repetition frequency that is an odd multiple of the line frequency. There are 397 periods in a line which results in a bit frequency of 6.20 MHz, with a non-return-to-zero modulation.

As described in the already mentioned U.S. Patent Application Ser. No. 689,493, a computer is used as an electronic managing unit which knows the list of the idle lines in a picture signal and inserts into those lines the data packs it receives from the various teletext editors, similar to that shown in FIG. 1. Connections between the various memories 6 and modulator circuitry 1 are preferably constituted of links, such as the link described in the French Pat. No. 2,268,308 entitled "Standardized communication interface device". Such a link makes it possible to slow down the data flow of a data source constituted by a data memory, when the broadcast system is blocked. When using a broadcasting network, it is not directly possible to control the output data flow from a source from the receiver entrance capacity. To overcome that lack of feedback control, a simulated receiver similar to the slowest receiver is provided in the managing unit. When using other transmission mediums, the link provides the functions needed for a correct transmission of the digital signals.

Reception terminal shown in FIG. 2 is designed to supplement a conventional television receiver and is used to demodulate the data signals transmitted from the station shown in FIG. 1, to reshape them, then to write them into a store so that it is possible to restore a visible page on the associated television receiver screen. Reception terminal may be a separate unit associated to a conventional television receiver or a portion integrated in an accordingly designed television receiver.

A reception terminal shown in FIG. 2 is similar to a conventional television receiver. A reception-demodulation circuit 10 delivering, on the one hand, audio signals to a loud-speaker 11 and, on the other hand, video signal to a color decoder and scanning generator 12. Color signals B1 (blue), V1 (green) and R1 (red) as well as luminance signal from generator 12 are not transmitted, contrary to what occurs in a conventional television receiver, directly to tube 13. The video signals are sent through a video switch 14 that has still another function as it will be hereafter described.

Furthermore, the receiver terminal shown in FIG. 2 comprises a circuit 15 for separating data from video signal, whose input is connected from video output of circuit 10 and output is connected to a first selection block 16, similar to the terminal equipment described in the already mentioned U.S. Patent Application 689,493. The output of block 16 is connected through a hereabove mentioned link J to a page selection block and data decoder 17 whose output is connected to the input of a page memory 18. A viewer keyboard 19 has its outputs suitably connected to control inputs of block 16 and 17. The output of memory 18 is connected to the input of a character generator 20. Signal outputs of character generator 20 are connected to color inputs R2 (red), V2 (green) and B2 (blue) of video switch 14 as well as to a luminance input 21 thereof. A control output of keyboard 19 is also connected to a control input of video switch 14.

In circuit 15 a stable oscillator, not shown, generates a clock signal at 6.20 MHz as mentioned above. When, after a detection of a line synchronization pulse, a video signal transmitted from demodulator 10 presents a sequence of alternative white and black points at that clock frequency, the oscillator in circuit 15 is phase locked with the received pulses. The oscillator output is then used as a clock for the received bits. Thus that oscillator is utilized to correctly separate the data video from a current television program video signal. Received bits are processed as eight-bit words in circuit 16 and service information, such as channel number and subscription period are taken therein into account to make only the directed channel or magazine valid. All the circuitry for performing such a process are described in the already mentioned British Pat. No. 1,467,240 and particularly regarding the validation of the desired channel described in FIG. 6 thereof.

Assuming that the validation is positive, received bits are sent to block 17 through link J. In practice, in the described embodiment, a channel of a system described in the already mentioned U.S. Patent Application Ser. No. 689,493 (U.S. Pat. No. 4,058,830) is equivalent to a magazine. It is known that the various channels of such a system are time multiplexed; so it is for the various magazines. As a result, link J transmits the data contents of a magazine serially per groups of 8-bit words, but with intervals between those groups due to two reasons, the first one of which results from the time multiplexed broadcasting mode of the magazines and the other one results from the transmission mode through link J. The transmission through link J from selector 16 to 17 is only possible when block 17 is ready to received data. Thus transmission through link J is performed in an asynchronous manner.

In block 17, a first operation is to select the desired page throughout the magazine. Indeed, as described in the already mentioned French technical article, a magazine is composed of several pages with particularly a first page indicating the magazine index or summary. In the magazine, the pages are naturally ordered according to increasing page numerals. It is also to be noted that, in broadcast a magazine, the pages thereof are not time multiplexed, i.e. page data are preceded by a 8-bit word representing a page flag, followed by the page number, and are followed by another 8-bit word representing another page flag followed by the next page number. As a result, in block 17 there is a detection of each page flag. Then, each time that a recognition is positive, a comparison is made between the immediately following page number 8-bit word and the page number dialled on keyboard 19. When the result of the comparison is negative, the already received 8-bit words and the following ones are destroyed up to the detection of the next page flag. When the result of the comparison is positive, the 8-words received up to the detection of the next page flag are transmitted to memory 18, after having been processed as follows. In each page, the characters are ordered in rows. In the sequence of data 8-bit words, each row is preceded by a row flag followed by a 8-bit word indicating the height of the following row in the page. The row number 8-bit word is used to determine one of the addresses of the characters to be stored in memory 18. The other address is determined by the position of the character 8-bit word in the sequence of character 8-bit words constituting a row, including blanks between characters. It must be noted that the sequence of 8-bit words constituting a row includes, in addition to the proper character words, some 8-bit words indicating character particulars such as the color. Those function 8-bit words or function word are also stored in memory 18 at the address of the characters which they characterize.

Thus, for obtaining the page which he wishes a magazine viewer first dials the suitable number on the keyboard 19 for consulting the magazine summary. From the above, the summary page is selected by selector 17. Then the viewer composes on keyboard 19 the number of the page he wishes to read.

It will be noted that the data stored in memory 18 provide an electronic geographic representation of the characters in the corresponding page. Those data are read out to the character generator 20 in using a time basis provided in such a manner as to make possible to read completely memory 18 in one television frame period. Character generator 20 receives each character 8-bit word read out from memory 18 and builds the corresponding letter shape from a video signal having two conditions, one condition being black and the other white. In addition, it receives the associated function 8-bit word indicating for instance the color and delivers the corresponding logic signals R2, V2 and B2.

To make clearer how signals delivered from generated 20 are displayed on screen 13, video switch 14 will now be described in detail in conjunction with FIG. 3. Video switch 14 makes it possible, on the one hand, to control switching of logic and analog signals to be displayed on tube screen 13, either corresponding to a text picture from generator 20 or (either animated or not) a current television picture from decoder 12, and, on the other hand, to determine the character color selected among 8 shades, i.e. for instance, red, green, blue, yellow, magenta, cyan, white and black.

Video switch 14 also performs an adaptation of the voltage/light characteristic of the tube to the control of the synthesized signals. Such an adaptation is currently performed in the transmission station, when broadcasting pictures, being known as the gamma-correction. With synthesized pictures wherein signals have a logic nature, no gamma-correction can be made at the transmission station. Accordingly, according to the present invention, means are provided for receiving the signals delivered from memory 18 and for fitting the corresponding voltages to suitable values which are needed to the control of the display tube.

For that purpose, video switch 14, shown in FIG. 3, has two sets of color signals inputs, i.e. on the one hand, R1, V1 and B1, and, on the other hand, R2, V2 and B2. Furthermore, a luminance input 21 is connected from the associated output of generator 20 while another luminance input 22 is connected from the associated output of decoder 12. Inputs 21 and 22 are respectively connected to inputs of amplifiers 23 and 24. Each amplifier 23 or 24 has a gain equal to 1 with a high input impedance and a low output impedance so as to be a voltage source. Signals delivered from amplifiers 23 and 24 are respectively adjusted by diodes 25 and 26 supplied by a stable voltage generator 27. Transfer time constants for those signals are determined by capacitors 28 and 29 according to the input impedance of amplifiers 30 and 31. Depending on the position of switch 32, controlled by a control signal from keyboard 19, via input 33, either the signal from 30 or signal from amplifier 31, respectively corresponding to either the signal applied to terminal 21 or the signal applied to terminal 22, is transmitted, via output 34, to luminance input of tube 13.

Inputs B1, V1 and R1 are respectively connected to associated inputs of a chrominance switch 35, through amplifiers 36B, 36V and 36R which operate as voltage sources, as amplifiers 23 and 24 act. Chrominance switch 35 is also controlled by control input 33. Inputs B2, V2 and R2 are respectively connected to inputs of logic signal amplifiers or inverters 37B, 37V and 37R. Outputs of amplifiers 37B, 37V and 37R are respectively connected, on the one hand, to inputs of a logic operator 38 and, on the other hand, to inputs of logic signal amplifiers 39B, 39V and 39R. The output of amplifier 39B is connected to the anode of a diode 40B whose cathode is connected, first, to the cathode of a diode 41B, second, to the cathode of a diode 42B and, finally, to the input of an amplifier 43B, operating as a voltage source, through a resistor 44B. The outputs of amplifiers 39V and 39R are also respectively connected to similar sets of diodes 40V, 41V and 42V, and 40R, 41R and 42R. The cathode of diode 40V is connected to the input of a voltage source amplifier 43V, via a resistor 44V, while the cathode of diode 40R is connected to the input of a voltage source amplifier 43R, via a resistor 44R. Furthermore anodes of diodes 40B, 40V and 40R are parallel connected from output of an adjustable voltage generator 45, through adjustable resistors 46B, 46V and 46R respectively. Anodes of diodes 41B, 41V and 41R are parallel connected from output of another adjustable voltage generator 47. Anodes of diodes 42B, 42V and 42R are parallel connected from the output of a last adjustable voltage generator 48, through a resistor 49, on the one hand, and from output of logic operator 38, on the other hand. Outputs of amplifiers 43B, 43V and 43R are respectively connected, as outputs of amplifiers 36B, 36V and 36R, to associated inputs of switch 35. Depending on the condition of control wire 33 from keyboard 19, chrominance switch 35 delivers from the outputs 50B, 50V and 50R to tube 13, either signals from amplifiers 43, or from amplifiers 36. Resistances 44R, 44V and 44B are adjustable resistors, serving to correct diode characteristics variations.

Now with reference to FIG. 4, it will be considered the voltages applied to respective inputs A, B and C of amplifiers 43R, 43V and 43B versus logic pulses delivered from generator 20 to inputs R2, V2 and B2.

First an assumption is made that at time t1 generator 20 delivers three logic pulses. Operator 38 is either an AND gate or a NOR gate, according to the technology in use. Its output is off which allows voltage generator 48 to apply through resistor 49 a turning-on voltage to diodes 42R, 42V and 42B, that voltage having the highest value, indicated by v3, (FIG. 4) and being transmitted to A, B and C. Assuming that switch 35 has been correctly switched via wire 33, the three amplifiers 43R, 43V and 43B transmit those voltages v3 to tube 13 which causes a white spot to appear on the screen of tube 13.

At time t2, an assumption is made that only inputs R2 and V2 receive logic pulses from generator 20, but input B2 receives no pulse. As a result thereof the output of logic operator 38 is grounded so that diodes 42R, 42V and 42B are off. Through the two logic inverters 37B and 39B, the zero voltage applied to input B2 is delivered from inverter 39B so that diode 40B is also off while diode 41B is on, and transmits to junction point C the voltage v1 delivered from amplifier 47. Pulses applied respectively to terminals R2 and V2 are transmitted through amplifiers 37R and 39R, and 37V and 39V, which turn diodes 40R and 40V on. As a voltage of value v2 delivered from voltage generator or amplifier 45 is higher than voltage of value v1 delivered from voltage generator or amplifier 47, diodes 41R and 41V are off and only voltages v2 are applied to junction points A and B. Voltages v2 from points A and B, and voltage v1 from point C are transmitted to tube 13 which displays a yellow spot. The other two combinations of pulses result in a cyan spot (B and C) and a magenta spot (R and B), respectively.

At time t3, (FIG. 4) an assumption is made that only input B2 receives a logic pulse from generator 20. The output of logic operator 38 is still grounded turning diodes 42R, 42V and 42B off. Diodes 40V and 40R are off because outputs of amplifiers or inverters 39V and 39R are grounded so that voltage v1 from generator 47 is applied, via diodes 41V and 41R, to junction points A and B, respectively. On the contrary, diode 40B is on and transmits the voltage v2 from 45 to junction point C. Voltages v1 from points A and B, and voltage v2 from point C are transmitted to tube 13 which displays a blue spot.

Between times t1 and t2, or times t2 and t3, the output of logic operator 38 is still grounded. Diodes 40R, 40V and 40B are off. Only the three diodes R1R, 41V and 41B are on. Voltage v1 is applied to all the junction points A, B and C. A black spot appears on the screen.

It results from the above that the switch circuit 14 provides a good flexibility in adjusting the colors. Particularly white is defined by adjusting voltage v3 from 48, black is defined by adjusting voltage v1 from 47, and basic colors R, G and B are defined by adjusting 45 and resistors 46R, 46V and 46B.

It would obviously be possible, instead of using a logic operator 38, to utilized several such operators, each being associated to an adjustable voltage generator, so as to permit the adaptation of the luminance of the various shades according to user's wishes.

What is claimed is:

1. A teletext system for digitally transmitting and displaying text material from any of many different services on a television screen, the digital transmission being in the form of data packs randomly intermixed from several channels, whereby successive data packs may relate to any of said completely different services, each of said packs having signals constituting a magazine of several pages, wherein the data belonging to each page are grouped in rows (or page lines), the data belonging to each row being preceded by a row flag followed by a row number, and ending with the next row flag, the row number detected after each row flag determining the address at which the row data must be stored in the said memory means, and wherein the data for each page of information begins with a page flag, said system comprising keyboard means for identifying a desired page, whereby signals from said keyboard select between said different services, comparator circuit means responsive to page flags for detecting said desired page responsive to operation of said keyboard means, memory means responsive to said comparator means for storing data relative to said desired page, and character generator means for displaying said desired page on a television screen responsive to the data stored in said memory means.

2. A teletext system according to claim 1, wherein said character generator means delivers to a matching circuit means character luminance signals, and additional logic pulses concerning the presence or the absence of basic colors R (red), V (green) or B (blue), said matching circuit means transferring the luminance signal to conventional circuits of a television receiver, said matching circuit means comprising in association with each basic color logic input a first diode having a cathode connected to an input of an analog amplifier means, switching means responsive to said keyboard means for selectively connecting an output of said basic color amplifier to a corresponding chrominance television tube input, the cathode of the first diode also being connected to cathodes of a second diode and a third diode, the first diode anode being connected from the associated color input and the output of a first voltage generator means for delivering a voltage V2, the second diode anode being connected from the output of a second voltage generator means for delivering a voltage V1, and the third diode anode being connected from the output of a third voltage generator means for delivering a voltage V3, the third voltage generator means having an output which is also connected to an output of a gate, the output of said gate not being grounded when the three color inputs simultaneously receive said logic pulses and being grounded in all other cases, with $V3 > V2 > V1$.

3. A teletext system according to claim 1 wherein said character generator means delivers to a matching circuit means character luminance signals, and additional logic pulses concerning the presence or the absence of basic colors R (red), V (green) or B (blue), the said matching circuit means transferring the luminance signal to conventional circuits of a television receiver, said matching circuit means comprising in association with each basic color logic input a first diode having a cathode connected to an input of a basic color analog amplifier means, switching means responsive to said keyboard means for selectively connecting an output of said basic color amplifier means to the corresponding chrominance television tube input, the cathode of the first diode also being connected to the cathodes of a second diode and a third diode, the first diode anode being connected from the associated color input and the output of a first voltage generator means for delivering a voltage V2, the second diode anode being connected from the output of a second voltage generator means for delivering a voltage V1, and the third diode anode being connected from the output of a third voltage generator means for delivering a voltage V3, the third voltage generator means having an output which is also connected to the output of a gate, the output of said gate not being grounded when the three color inputs simultaneously receive said logic pulses and being grounded in all other cases, with $V3 > V2 > V1$.

* * * * *